United States Patent
Ahn (10) Patent No.: US 10,084,159 B2
(45) Date of Patent: Sep. 25, 2018

(54) BATTERY CELL UNIT, BATTERY MODULE AND BATTERY SYSTEM USING POUCH CONTACT TYPE BATTERY CELL

(71) Applicant: Hyundai Motor Company, Seoul (KR)

(72) Inventor: Jin-Han Ahn, Seoul (KR)

(73) Assignee: Hyundai Motor Company, Seoul (KR)

( * ) Notice: Subject to any disclaimer, the term of this patent is extended or adjusted under 35 U.S.C. 154(b) by 322 days.

(21) Appl. No.: 14/954,271

(22) Filed: Nov. 30, 2015

(65) Prior Publication Data

US 2016/0372716 A1 Dec. 22, 2016

(30) Foreign Application Priority Data

Jun. 17, 2015 (KR) .................. 10-2015-0085792

(51) Int. Cl.
*H01M 6/46* (2006.01)
*H01M 2/02* (2006.01)
*H01M 2/10* (2006.01)
H01M 10/04 (2006.01)

(52) U.S. Cl.
CPC ......... *H01M 2/024* (2013.01); *H01M 2/1077* (2013.01); *H01M 10/0481* (2013.01); *H01M 2220/20* (2013.01)

(58) Field of Classification Search
CPC .. H01M 2/024; H01M 2/0245; H01M 2/0247; H01M 2/0277; H01M 2/029; H01M 2/0292; H01M 2/08; H01M 2/1072; H01M 2/1077; H01M 10/0481; H01M 10/0413; H01M 10/0486; H01M 2220/20
See application file for complete search history.

(56) References Cited

U.S. PATENT DOCUMENTS

| 8,771,863 | B2 | 7/2014 | Amagai et al. |
| 2012/0028094 | A1 | 2/2012 | Kim et al. |
| 2013/0330606 | A1* | 12/2013 | Kwon ............ H01M 2/021 |
| | | | 429/185 |

FOREIGN PATENT DOCUMENTS

| JP | 2010-257652 A | 11/2010 |
| KR | 10-2007-0112490 A | 11/2007 |
| KR | 10-2013-0017129 A | 2/2013 |
| KR | 10-2013-0065286 A | 6/2013 |
| KR | 10-2014-0031581 A | 3/2014 |
| KR | 10-2014-0057701 A | 5/2014 |
| KR | 2014-0084561 A | 7/2014 |
| KR | 10-2015-0035095 A | 4/2015 |

\* cited by examiner

*Primary Examiner* — Raymond Alejandro
(74) *Attorney, Agent, or Firm* — Mintz Levin Cohn Ferris Glovsky and Popeo, P.C.; Peter F. Corless (57) ABSTRACT

A pouch contact type battery cell is provided. The cell includes a gap filling member that is positioned inside a plurality of cell covers that are made of an aluminum material and enclose two pouches and remove a non-contact gap G for preventing electrical insulation breakdown of the pouches and the cell covers in the contacted state with extending portions of the pouches, respectively. A battery module includes a battery cell unit in which the plurality of pouch contact type battery cells are stacked and a battery system includes the battery module. Accordingly, performance of an electric vehicle or a hybrid vehicle is improved due to a reduction in weight based on the reduction in size and volume.

9 Claims, 5 Drawing Sheets

ENLARGED VIEW OF PORTION A

BATTERY CELL UNIT, BATTERY MODULE AND BATTERY SYSTEM USING POUCH CONTACT TYPE BATTERY CELL

CROSS-REFERENCE TO RELATED APPLICATIONS

This application claims priority to Korean Patent Application No. 10-2015-0085792, filed on Jun. 17, 2015, which is incorporated herein by reference in its entirety.

BACKGROUND

Field of the Invention

The present invention relates to a battery cell, and more particularly, to a battery cell unit, a battery module, and a battery system using a pouch contact type battery cell from which a non-contact gap necessarily used to prevent a pouch from being damaged is removed.

Description of Related Art

Recently, technologies for optimizing vehicle performance have been developed as electric and hybrid vehicles are being increasingly researched. An example of the technology development may include a weight reduction technology of a battery system.

In particular, a battery system applied to the electric vehicle or the hybrid vehicle supplies power required to drive a vehicle and operate other apparatuses. The battery system occupies a substantial weight portion of the vehicle, and thus the weight reduction technology of the battery system may contribute to improvement in performance of the electric vehicle or the hybrid vehicle.

However, the battery system includes a battery module in which a plurality of battery cells are laminated. Each battery cell requires a non-contact gap for electrical insulation breakdown prevention of a pouch and therefore there is a limitation of reducing a size and a volume of the battery module, which limits the reduction in size, volume, and weight of the battery system.

For example, the structure of the battery cell including a pouch and a cell cover that encloses the pouch is based on forming the non-contact gap for the pouch in an inner space of the cell cover and allowing the non-contact gap to prevent a cell cover contact of the pouch which causes damage. In particular, the non-contact gap should be equal to or greater than about 5 mm. Therefore, the size of the battery cell includes the non-contact gap, which may limit the reduction in size and volume of the battery module and the battery system. In particular, the battery system has the battery module received in the battery case of a steel material (or material having predetermined rigidity), in which the battery case of which the size may not be reduced may further increase the weight of the system.

SUMMARY

The present invention provides a battery cell unit, a battery module, and a battery system using a pouch contact type battery cell capable of reducing a length of the battery cell by removing a non-contact gap used for electrical insulation damage prevention of the pouch and reducing a size, a volume, and a weight using the battery cell having a reduced length.

Other objects and advantages of the present invention may be understood by the following description, and become apparent with reference to the exemplary embodiments of the present invention. Additionally, it is obvious to those skilled in the art to which the present invention pertains that the objects and advantages of the present invention may be realized by the means as claimed and combinations thereof.

In accordance with an exemplary embodiment of the present invention, a pouch contact type battery cell may include: a pair of first pouch and second pouch stacked by being folded with each other and enclosed with a cell pouch having extending parts of which both ends are folded; a pair of upper cell and lower cell covers made of an aluminum material and attached on the first pouch and beneath the second pouch, respectively, to be enclosed while being spaced apart from the extending parts of the first and second pouches; a gap filling member configured to form a contact state to the extending parts of the first and second pouches at left and right coupling portions of the upper cell cover and the lower cell cover and remove a non-contact gap for preventing electrical insulation breakdown; and a pair of first and second pouch cases coupled with left and right coupling portions of the upper and lower cell covers.

The cell pouch may include a base layer made of a nylon material, an intermediate layer made of an aluminum material, and a surface layer of a polypropylene composite material, and the extending parts may be folded. One end of the upper cell cover may form a bent upper end, one end of the lower cell cover may form a bent lower end, the lower end may be positioned inside the upper end to contact the gap filling member, and a wedge portion of the upper end and a clamp portion of the lower end may contact the gap filling member.

The gap filling member may contact left and right extending parts of the cell pouch, respectively, may have a thickness less than the non-contact gap, and may be made of modified polyphenylene oxide resin (modified PPO resin) and glass fiber. The first pouch case may contact one end at which the upper and lower cell covers overlap each other and the second pouch case may form an interval from the other end at which the upper and lower cell covers overlap each other.

In accordance with another exemplary embodiment of the present invention, a battery cell unit may include: a battery cell including first and second pouches stacked by being folded with each other, upper and lower cell covers that enclose the first and second pouches and made of an aluminum material, a gap filling member positioned between extending parts of the first and second pouches and the upper and lower cell covers, and first and second pouch cases coupled with left and right coupling parts of the upper and lower cell covers, respectively. The battery cell may be divided into first, . . . , n-th battery cells $1a, \ldots, 1n$ (e.g., n is an integer which is equal to or greater than 2) which may be stacked with each other. Any one of the first, . . . , the n-th battery cells $1a, \ldots, 1n$ may be provided with a power drawing portion which draws power.

In accordance with still another exemplary embodiment of the present invention, a battery module may include: a power unit configured to include first and second pouches stacked by being folded with each other, upper and lower cell covers that enclose the first and second pouches and made of an aluminum material, a gap filling member positioned between extending parts of the first and second pouches and the upper and lower cell covers, and first and second pouch cases coupled with left and right coupling parts of the upper and lower cell covers, respectively; a mounting bolt configured to fix first, . . . , n-th power units into which the power unit is divided and which may be stacked with each other; and a battery module bracket disposed within the power unit. Any one of the first, . . . , the n-th power units may be provided with a power drawing portion which draws power of a battery module.

In accordance with still yet another exemplary embodiment of the present invention, a battery system may include: a battery cell including first and second pouches stacked by being folded with each other, upper and lower cell covers that enclose the first and second pouches and made of an aluminum material, a gap filling member positioned between extending parts of the first and second pouches and the upper and lower cell covers, and first and second pouch cases coupled with left and right coupling parts of the upper and lower cell covers, respectively; a battery module having the plurality of battery cells stacked therein; a battery case that forms a battery module receiving portion in which the battery module is received; and a mounting bracket disposed within the battery case.

BRIEF DESCRIPTION OF THE DRAWINGS

A brief description of each drawing is provided to more sufficiently understand drawings used in the detailed description of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings and these embodiments may be implemented in various forms by a person having ordinary skill in the art to which the present invention pertains and therefore the present invention is not limited to the embodiments described herein.

Figure 1A:
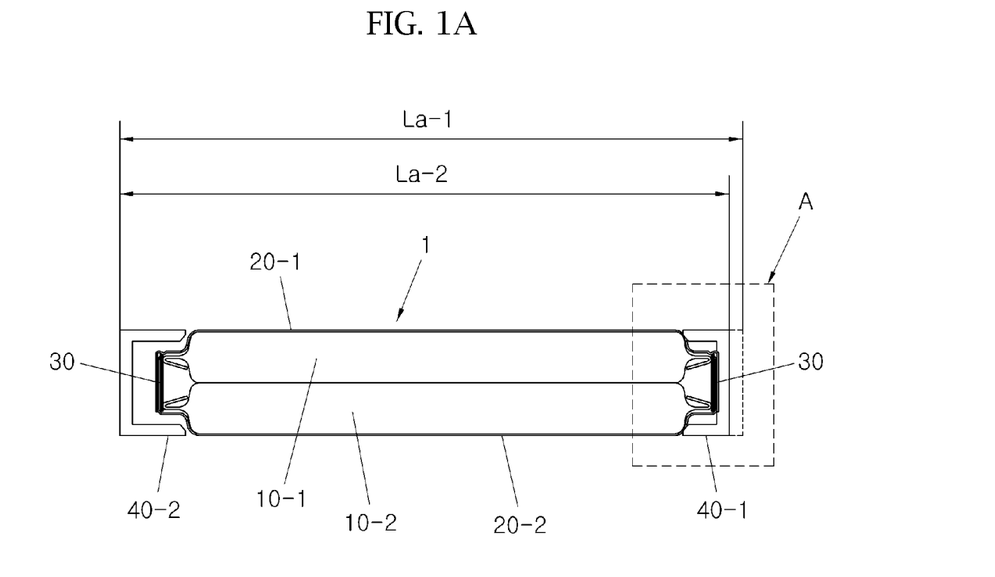
FIGS. 1A-1B are configuration diagrams of a pouch contact type battery cell according to an exemplary embodiment of the present invention.
Figure 1B:
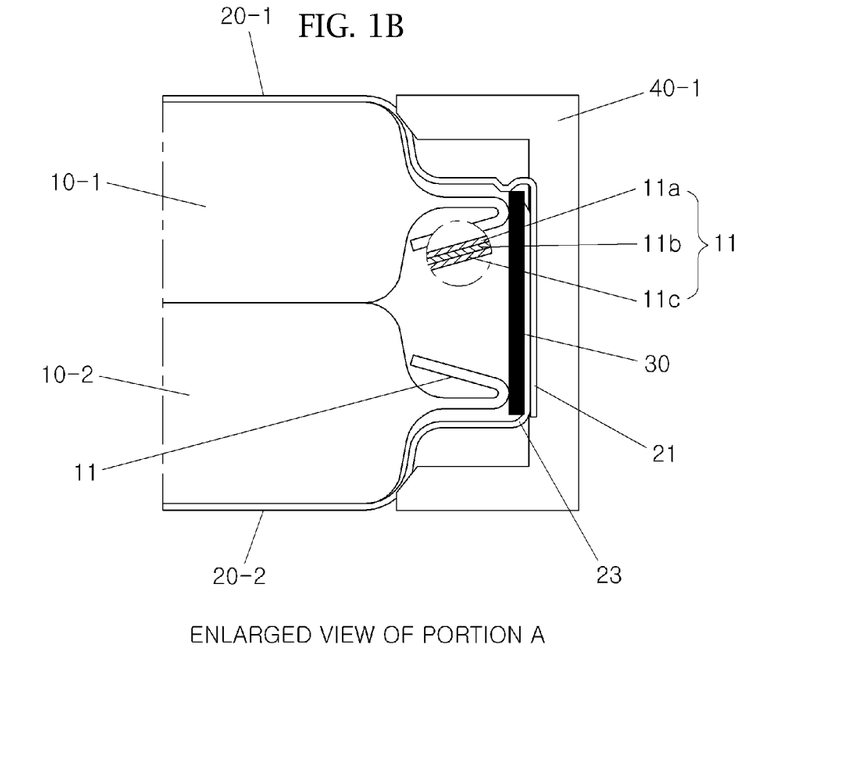
Figure 2:
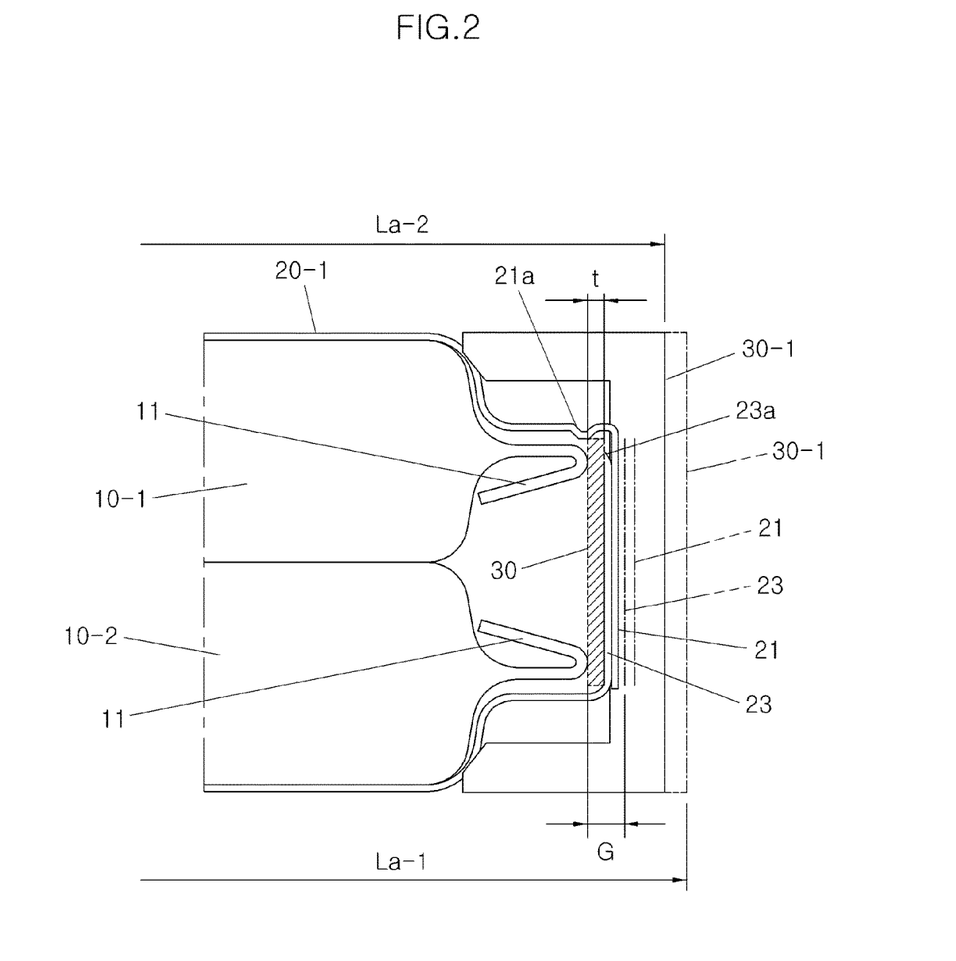
FIG. 2 is a pouch contact structure diagram of a battery cell according to an exemplary embodiment of the present invention.

FIGS. 1 and 2 illustrate a configuration of a pouch contact type battery cell 1 according to an exemplary embodiment of the present invention. As illustrated in FIGS. 1 and 2, the battery cell 1 may include a pair of first and second pouches 10-1 and 10-2, a pair of upper and lower cell covers 20-1 and 20-2, and a pair of first and second pouch cases 40-1 and 40-2.

In particular, the first pouch 10-1 and the second pouch 10-2 may be the same type of pouch. For example, each of the first and second pouches 10-1 and 10-2 may be sealed with a cell pouch 11 to secure cell pressure resistance and the cell pouch 11 may have a triple section structure that includes a base layer 11a enclosing the cell, a surface layer 11c exposed to the exterior, and an intermediate layer 11b between the base layer 11a and the surface layer 11c. The base layer 11a may be made of a nylon material, the intermediate layer 11b may be made of an aluminum material, and the surface layer 11c may be made of a polypropylene (PP) composite material. Therefore, the cell pouch 11 may be manufactured by a method of attaching a nylon material to one surface (e.g., a first surface) of an aluminum material and a PP composite material to the other surface (e.g., a second surface) thereof. Each of the margin parts of left and right sides of the cell pouch 11 after the cell pouch 11 encloses the cell may be folded, and thus each of the margin parts of the first and second pouches 10-1 and 10-2 do not contact each other when the first and second pouches 10-1 and 10-2 are stacked while being folded.

Additionally, the upper cell cover 20-1 may be made of the aluminum material and may be attached on the first pouch 10-1 of the first and second pouches 10-1 and 10-2 stacked while being folded with each other, and upper ends 21 which are ends of left and right sides may be folded toward the second pouch 10-2. The lower cell cover 20-2 may be made of the aluminum material and may be attached beneath (e.g. below) the second pouch 10-2 of the first and second pouches 10-1 and 10-2, low ends 23 which are ends of left and right sides may be folded toward the first pouch 10-1. The upper end 21 may be positioned outside (e.g., extraneous to) the lower end 23. Therefore, the upper cell cover 20-1 and the lower cell cover 20-2 may be coupled when folded with each other. In particular, the folded portion of the upper end 21 may include a wedge portion 21*a* and an end of the lower end 23 may include a bent clamp portion 23*a*.

Further, a gap filling member 30 may be positioned inside the lower end 23 of the lower cell cover 20-2 with which the upper end 21 of the upper cell cover 20-1 is folded from the exterior and may contact the folded margin parts of the first and second pouches 10-1 and 10-2. The gap filling member 30 may be disposed on the left and right parts of the upper cell cover 20-1 and the lower cell cover 20-2, respectively. In particular, the fixing force of the gap filling member 30 may be additionally applied in which the gap filling member 30 contacts the wedge portion 21*a* formed at the upper end 21 of the upper cell cover 20-1, and at the same time may be applied while engaging with the clamp portion 23*a* formed at the lower end 23 of the lower cell cover 20-2. Accordingly, the gap filling member 30 may be formed of MPPO+GF 10% as a component and thus may have excellent insulation and flame retardancy.

In particular, the MPPO is modified polyphenylene oxie resin (modified PPO resin) and the GF is glass fiber. However, the gap filling member 30 may be made of various materials to implement electrical insulation. Therefore, the gap filling member 30 may be configured to remove a non-contact gap G required to prevent the first and second pouches 10-1 and 10-2 and the upper and lower cell covers 20-1 and 20-2 from contacting each other. For example, the non-contact gap G may be equal to or greater than about 5 mm, while a thickness t of the gap filling member 30 may be equal to or less than ½ of the non-contact gap G.

The first and second pouch cases 40-1 and 40-2 may be each coupled with the left and right parts of the lower cell covers 20-1 and 20-2 to protect the upper and lower ends 21 and 23 of the upper and lower cell covers 20-1 and 20-2 from the exterior. Further, the first pouch case 40-1 may contact (e.g., abut) the upper and lower ends 21 and 23 of the upper and lower cell covers 20-1 and 20-2 and the second pouch case 40-2 may form an interval (e.g., a space) from the upper and lower ends 21 and 23 of the upper and lower cell covers 20-1 and 20-2. Therefore, the second pouch case 40-2 may include a power drawing portion which draws the power of the battery cell 1.

In particular, the first and second pouch cases 40-1 and 40-2 may be coupled with the left and right parts of the upper and lower cell covers 20-1 and 20-2 along with the gap filling member 30 without forming the non-contact gap G. Therefore, each of the first and second pouch cases 40-1 and 40-2 may remove the non-contact gap G which is equal to or greater than about 5 mm, and thus the length of the first and second pouch cases 40-1 and 40-2 may be relatively short.

As a result, even though a full length La-2 of the first and second pouch cases 40-1 and 40-2 requiring the two gap filling members 30 is shorter than a full length La-1 of the first and second pouch cases 40-1 and 40-2 requiring the two non-contact gaps Gs, the insulation breakdown problem of the battery cell 1 may be resolved. In particular, the full length La-2 of the pouch case may be reduced as much as a difference obtained by subtracting the thickness t of the gap filling member 30 from the non-contact gap G. For example, when the length of the non-contact gap G is about 5 mm and the thickness t of the gap filling member 30 is about 2 mm, the full length La-1 of the pouch case my be about 10 mm, while the full length of the pouch case may be about 4 mm. When the gap filling member 300 includes one portion, the full length of the pouch case La-2 may be about 7 mm.

In addition, the gap filling member 30 may completely adhere to the lower end 23 of the lower cell cover 20-2 while contacting (e.g., abutting) the wedge portion 21*a* formed at the upper end 21 of the upper cell cover 20-1, and thus the insulation breakdown problem may be resolved without substantially forming the interval between the cell pouch 11 and the upper and lower cell covers 20-1 and 20-2. Therefore, the full length La-2 of the pouch case of the battery cell 1 contributes to the reduction in size, volume, and weight of the battery module as well as the reduction in size, volume, and weight of the battery system, which contributes the improvement in performance of the electric car or the hybrid vehicle.

When the battery cell 1 maintains the full length La-1 of the pouch case which is relatively longer, it may be possible to increase the capacity of the first and second pouches 10-1 and 10-2 as much as a difference between the full length La-1 of the pouch case and the full length La-2 of the pouch case. Therefore, the battery cell 1 may increase the capacity of the battery module even though the size and the volume of the battery module are the same as before and may be relatively excellent in the power management of the electric vehicle or the hybrid vehicle even though the size and the volume of the battery system are the same as before.

Figure 3:
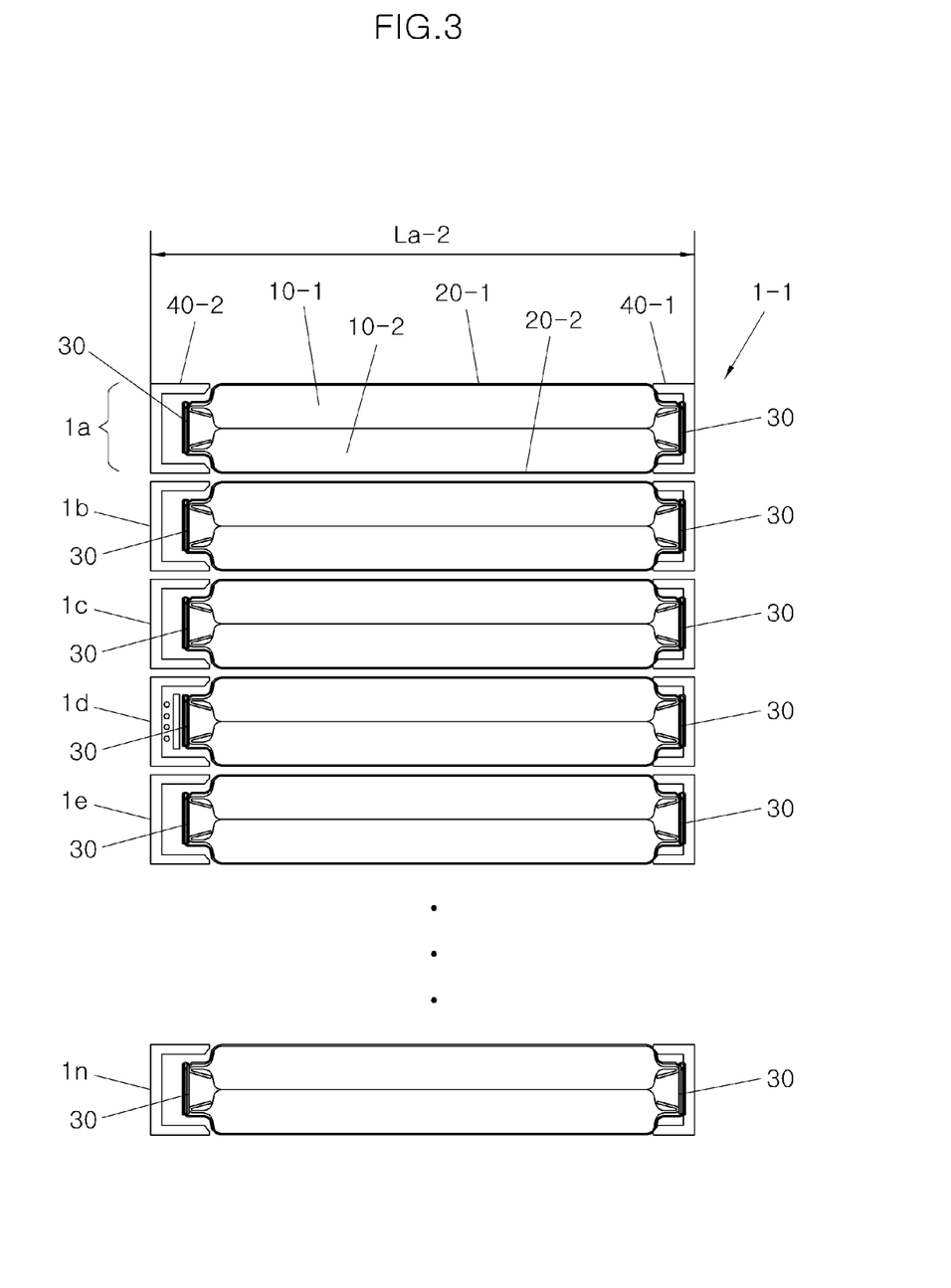
FIG. 3 is a configuration diagram of a battery cell unit in which the pouch contact type battery cells according to the exemplary embodiment of the present invention are laminated.

Meanwhile, FIG. 3 illustrates an exemplary embodiment of a battery cell unit 1-1 in which the plurality of battery cells 1 are stacked. As illustrated in FIG. 3, the battery cell unit 1-1 is configured by stacking first, . . . , n-th battery cells 1*a*, . . . , 1*n* (n is an integer which is equal to or greater than 2). Each of the first, . . . n-th battery cells 1*a*, . . . , 1*n* may include the first and second pouches 10-1 and 10-2, the upper and lower cell covers 20-1 and 20-2, the gap filling member 30, and the first and second pouch cases 40-1 and 40-2, which is the same as the battery cell 1 described with reference to FIGS. 1 and 2. However, any one of the first, . . . , n-th battery cells 1*a*, . . . , 1*n* may include the power drawing portion which draws the power of the battery cell unit 1-1.

Therefore, the battery cell unit 1-1 may meet the specifications of the battery required in the electric vehicle or the hybrid vehicle using the number of stacked battery cells 1. In particular, the battery cell unit 1-1 may be applied with the gap filling member 30 that removes the non-contact gap G and thus the full length of the pouch case may be relatively shorter than the case in which the non-contact gap G is present, thereby implementing the miniaturization and the reduction in weight. In addition, when the battery cell unit 1-1 includes the battery cell 1 having the increased capacity due to the full length La-1 of the pouch case which is relatively longer even when the gap filling member 30 is applied, the size and the volume of the battery cell unit 1-1 are not reduced but the capacity of the battery cell unit 1-1 may be increased.

Figure 4:
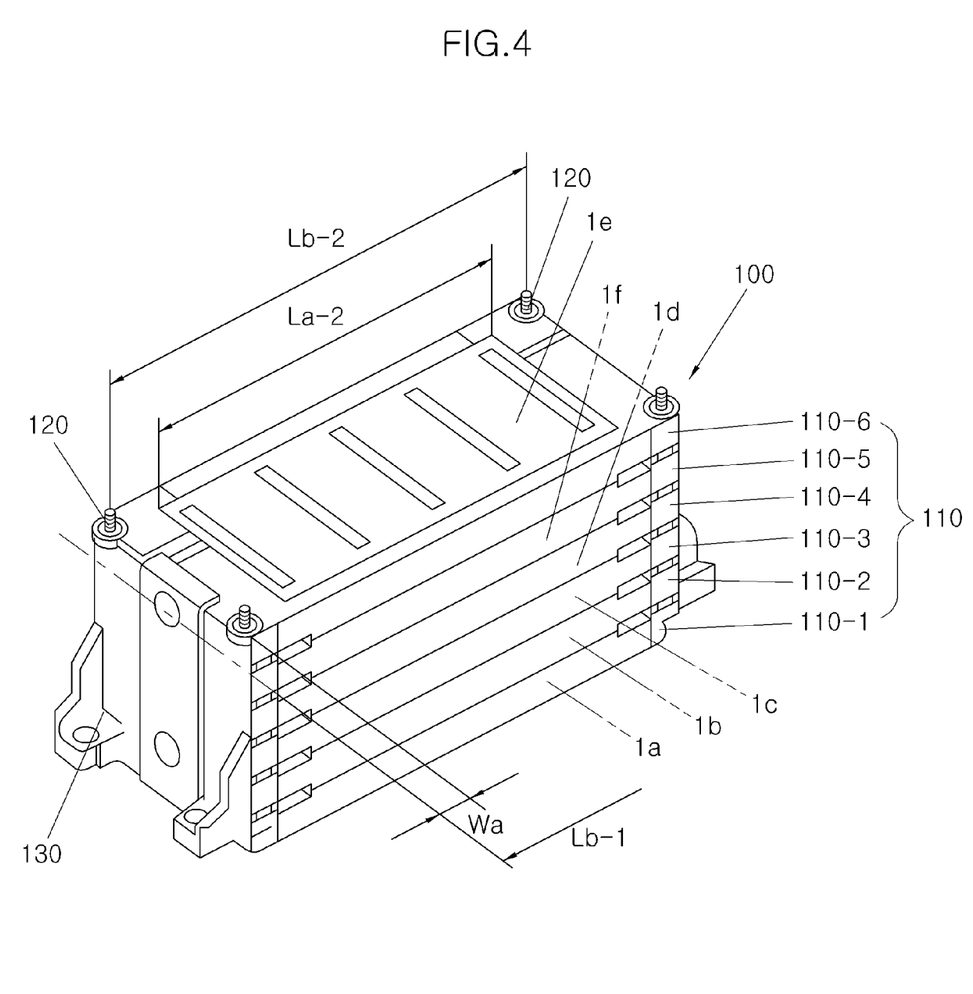
FIG. 4 is a configuration diagram of a battery module using the pouch contact type battery cells according to the exemplary embodiment of the present invention.

Meanwhile, FIG. 4 illustrates an exemplary embodiment of the battery module 100 to which the battery cell 1 is applied. As illustrated in FIG. 4, the battery module 100 may include a power unit 110, a mounting bolt 120, and a battery module bracket 130.

The power unit 110 may include first, . . . , sixth power units 110-1, . . . , 110-6 and each of the first, . . . , sixth power units 110-1, . . . , 110-6 may include the battery cell 1 having the first and second pouches 10-1 and 10-2, the upper and lower cell covers 20-1 and 20-2, and the first and second pouch cases 40-1 and 40-2. The battery cell is the same as the battery cell 1 described with reference to FIGS. 1 and 2. In particular, any one of the first, . . . , sixth power units 110-1, . . . , 110-6 may include the power drawing portion which draws the power of the battery module 100.

The mounting bolt 120 may be configured to couple the first, . . . , sixth power units 110-1, . . . , 100-6 to be integrated and may be configured in four each of which may be fastened with four corner portions of the first, . . . , sixth power units 110-1, . . . , 110-6. The battery module bracket 130 may be disposed at left and right sides of the power units 110 which are integrated by the mounting bolts 120 and thus may operate as a fastener for fixing or mounting. Therefore, the battery module 100 may meet the specifications of the battery required in the electric vehicle or the hybrid vehicle using the number of used battery cells 1.

In addition, the power unit 110 may form a reduction width Wa (e.g., a difference between the full length La-1 of the pouch case to which the gap filling member 30 is not applied and the full length La-2 of the pouch case to which the gap filling member 30 is applied) of the full length of the battery by the battery cell 1, and thus a full length Lb-2 of the battery module 100 is short and the shortened full length Lb-2 of the battery module contributes to the reduction in size, volume, and weight of the battery module 100. Particularly, the Lb-1 indicates the full length of the battery module when the power unit 110 is not applied. When the power unit 110 includes the battery cell 1 having the increased capacity due to the full length La-1 of the pouch case which is relatively longer even when the gap filling member 30 is applied, the size and the volume of the battery module 100 are not reduced but the capacity of the battery module 100 may be increased.

Figure 5:
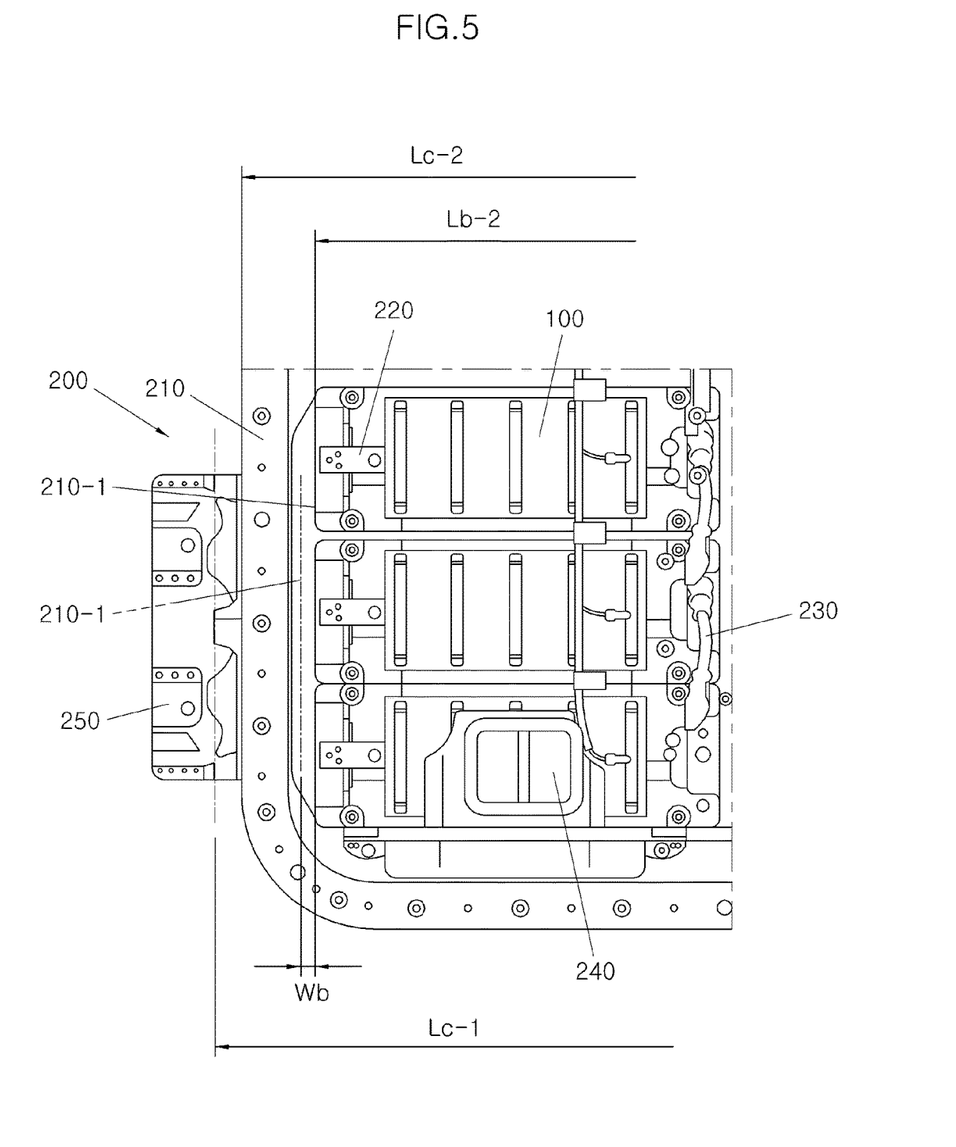
FIG. 5 is a partial configuration diagram of the battery system including the battery module using the pouch contact type battery cell according to the exemplary embodiment of the present invention.

Meanwhile, FIG. 5 illustrates an exemplary embodiment of the battery system 200 to which the battery cell 1 is applied. As illustrated in FIG. 5, the battery system 200 may include the battery module 100, a battery case 210, a power bar 220, a power cable 230, a power connector 240, and a mounting bracket 250.

The battery module 100 is the same as the power unit 110 integrated by the mounting bold 120 described with reference to FIG. 4 and the battery module bracket 130 may not be applied when considering the structure of the battery case 210. The battery case 210 may form a battery module receiving portion 210-1 configured to receive the battery module 100, thereby protecting the battery module 100 from the external environment. In particular, the battery case 210 may lead to a reduction width Wb of the full length of the battery case due to the reduction width Wa of the full length of the battery of the power unit 110 of the battery module 100, thus reducing a full length Lc-2 of the battery case 210. In addition, the shortened full length Lc-2 of the battery case may prevent the interference of the corner part of the battery module 100 when the battery module 100 is inserted into the battery module receiving portion 210-1. The Lc-1 may indicate the full length of the battery case when the battery case 210 is not applied.

Furthermore, the power bar 220 may bind the first, . . . , sixth power units 110-1, . . . , 110-6 of the battery module 100 to electrically connect each of the first, . . . , sixth power units 110-1, . . . , 110-6. The power cable 230 may be configured to draw the power of the battery module 100. The power connector 240 may form a connection portion to which external devices using the power of the battery module 100 may be connected. The mounting bracket 250 may be disposed within the battery case 210 to operate as the fastening portion for fixing or mounting.

Therefore, the battery system 200 may be reduced as much as the full length Lc-2 of the battery case 210 and thus the size, the volume, and the weight thereof may be reduced. As the result, when the battery system 200 is applied to the electric vehicle or the hybrid vehicle, the battery system 200 may have the improved vehicle mountability and the reduced weight, thereby improving the performance of the electric vehicle or the hybrid vehicle.

In particular, when the battery system 200 uses the gap filling member 30 and uses the battery module 100 including the battery cell 1 having the increased capacity by maintaining the full length La-1 of the pouch case, the size, the volume, and the weight of the battery system 200 may not be reduced but the power capacity of the electric vehicle or the hybrid vehicle may be increased, since the full length Lc-1 of the battery case 210 is longer than the full length Lc-2 of the battery case.

As described above, the pouch contact type battery cell 1 according to the exemplary embodiment of the present invention may include the gap filling member 30 disposed inside the cell covers 20-1 and 20-2 made of the aluminum material enclosing the two pouches 10-1 and 10-2 and may remove the non-contact gap G for preventing electrical insulation breakdown of the pouches 10-1 and 10-2 and the cell covers 20-1 and 20-2 in the contacted state with the extending portions of the pouches 10-1 and 10-2, respectively. The battery module 100 may include the battery cell unit 1-1 in which the plurality of pouch contact type battery cells are stacked, and the battery system 200 may include the battery module 100, thereby reducing the size and the volume of the battery module 100 and the battery system 200 due to the full length La-2 of the pouch case of the battery cell 1 reduced as much as the removal of the non-contact gap G and improving the performance of the electric vehicle or the hybrid vehicle due to the reduction in weight based on the reduction in size and volume.

According to the exemplary embodiments of the present invention, the battery cell including the pouch and the cell cover that encloses the pouch may be configured without the non-contact gap between the pouch and the cell cover, and thus may be manufactured to have a relatively shorter length. Further, the battery module may have a structure in which the battery cell having a length shorter than that of the non-contact gap type battery cell is laminated in plural, and thus the size, the volume, and the weight of the battery module may be reduced, in particular, the battery module may be manufactured more compactly as much as the reduced size and volume.

Further, according to the exemplary embodiments of the present invention, the battery system may include a more compact battery module than the battery module configured to include the non-contact gap type battery cell, and thus the size and the volume of the battery system may be reduced, in particular, the weight of the battery system may be reduced in response to the reduction in size of the battery case of the steel material (or material having predetermined rigidity). The battery system may be manufactured more compactly due to the reduced size, volume, and weight, and thus the battery system may have the improved vehicle mountability while being applied to the electric vehicle or the hybrid vehicle, in particular, improve the performance of the electric vehicle or the hybrid vehicle due to the reduced weight.

The foregoing exemplary embodiments are merely examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. It will thus be apparent to those skilled in the art that substitutions, modifications and variations can be made without departing from the spirit and scope of the invention as defined by the appended claims and can also belong to the scope of the present invention.

What is claimed is:

1. A pouch contact structure of battery cell, comprising:
   a gap filling member disposed inside an upper and a upper cell cover and configured to enclose a first and a second pouch and contact the first and second pouches to fill a separation interval of the first and the second pouches and the upper and the lower covers; and
   a first and a second pouch case coupled with the upper and the lower cell covers,
   wherein the second pouch is staked with the first pouch,
   wherein the upper cell cover encloses an upper part of the first pouch while spaced apart from an extending part of a cell pouch sealing the first pouch and the lower cell cover encloses a lower part on the second pouch while being spaced from the extending part of the cell pouch sealing the second pouch,
   wherein the gap filling member contacts the extending part of the cell pouch, and
   wherein the first pouch case is coupled with the upper cell and a first end of the lower cell cover and the second pouch case is coupled with the upper cell and a second end of the lower cell cover.

2. The pouch contact structure of battery cell of claim 1, wherein the upper and lower cell covers are made of an aluminum material, the separation interval is a gap that prevents electrical insulation breakdown of the first and second pouches and the upper and lower cell covers, and the first and second pouch cases are each coupled with left and right sides of the upper and the lower cell covers.

3. The pouch contact structure of battery cell of claim 1, wherein the cell pouch includes a base layer made of a nylon material, an intermediate layer made of an aluminum material, and a surface layer made of a polypropylene composite material.

4. The pouch contact structure of battery cell of claim 1, the extending part of the cell pouch is folded.

5. The pouch contact structure of battery cell of claim 1, wherein an end of the upper cell cover forms a bent upper end, one end of the lower cell cover forms a bent lower end, and the lower end is disposed inside the upper end to contact the gap filling member.

6. The pouch contact structure of battery cell of claim 5, wherein the bent upper end forms a wedge portion, the bent lower end forms a clamp portion, and the wedge portion and the clamp portion contact the gap filling member.

7. The pouch contact structure of battery cell of claim 1, wherein the gap filling member contacts left and right extending parts of the cell pouch, respectively, and has a thickness less than the separation interval.

8. The pouch contact structure of battery cell of claim 7, wherein the gap filling member is made of polyphenylene oxide and glass fiber.

9. The pouch contact structure of battery cell of claim 1, wherein the first pouch case contacts a first end at which the upper and lower cell covers overlap and the second pouch case forms an interval from a second end at which the upper and lower cell covers overlap.

* * * * *